US008276232B2

(12) United States Patent  (10) Patent No.: US 8,276,232 B2
Rau  (45) Date of Patent: Oct. 2, 2012

(54) DEVICE AND METHOD FOR CLEANING WHEEL RIMS

(75) Inventor: Thomas Rau, Boeblingen (DE)

(73) Assignee: Eisenmann AG (DE)

( * ) Notice: Subject to any disclaimer, the term of this patent is extended or adjusted under 35 U.S.C. 154(b) by 1273 days.

(21) Appl. No.: 11/792,891

(22) PCT Filed: Oct. 29, 2005

(86) PCT No.: PCT/EP2005/011613
§ 371 (c)(1),
(2), (4) Date: Feb. 8, 2008

(87) PCT Pub. No.: WO2006/066652
PCT Pub. Date: Jun. 29, 2006

(65) Prior Publication Data
US 2009/0025159 A1  Jan. 29, 2009

(30) Foreign Application Priority Data
Dec. 15, 2004 (DE) .......................... 10 2004 060 859

(51) Int. Cl.
B60S 3/00 (2006.01)
(52) U.S. Cl. .......................................... 15/53.4; 15/21.1
(58) Field of Classification Search .................... 15/21.1, 15/53.4
See application file for complete search history.

(56) References Cited

U.S. PATENT DOCUMENTS

| 2,915,766 A | * | 12/1959 | Peterson | ......................... 15/21.1 |
| 4,467,489 A | | 8/1984 | Begneaud | |
| 4,480,433 A | * | 11/1984 | Ryer, II | ........................... 57/302 |
| 4,723,335 A | | 2/1988 | Kane | |
| 7,325,268 B1 | * | 2/2008 | Curcuri et al. | .................. 15/97.1 |

FOREIGN PATENT DOCUMENTS

| DE | 23 55 763 A1 | 5/1975 |
| DE | 78 23 879 U1 | 12/1978 |
| DE | 37 40 627 C2 | 6/1989 |

* cited by examiner

Primary Examiner — Randall Chin
(74) Attorney, Agent, or Firm — Factor Intellectual Property Law Group, Ltd.

(57) ABSTRACT

Disclosed is a device for cleaning wheel rims. Said device is used for removing sticky excess powdered pigments from the flange and hub of the rims prior to the baking process during powder coating. The inventive device comprises a first brush which can be introduced into the hub of a rim that is to be cleaned as well as a second brush which is concentrically disposed around the first brush and rests against the flange surface of the rim when the first brush is inserted in the hub of the rim. The first brush can be axially displaced relative to the second brush and is spring-mounted on the second brush. Furthermore, a drive unit is provided which rotates the first and the second brush by a specific angle, respectively.

14 Claims, 4 Drawing Sheets

DEVICE AND METHOD FOR CLEANING WHEEL RIMS

RELATED APPLICATIONS

This application claims the filing benefit of PCT Patent Application PCT/EP2005/11613, filed Oct. 29, 2005; and German Patent Application No. 10 2004 060 859.8, filed Dec. 15, 2004 the contents of which are incorporated herein by reference.

TECHNICAL FIELD

The invention relates to a device and a method for cleaning wheel rims.

BACKGROUND OF THE INVENTION

Wheel rims for motor vehicle wheels, in particular aluminium wheel rims, must be lacquered or coated for corrosion prevention reasons, although also for visual reasons. Powder coating is a particularly environmentally friendly coating method. For this purpose a powdered lacquer is applied to the wheel rim which is to be coated and then baked.

However the fact that powder can also reach the inner flange side of the wheel rim and enter the hub of the latter and then be baked here is problematic in this case. These coating traces must subsequently be removed manually in a finishing operation by mechanical abrasion. However the abrasion has an adverse effect on the geometrical and positional tolerances of the wheel rims. The flange side and the hub of the wheel rim may alternatively also be cleaned manually of excess powdered pigments prior to the baking process. However this is highly labour-intensive.

The present invention is directed to resolving these and other matters.

SUMMARY OF THE INVENTION

An object of the present invention is therefore to indicate a device and a method for cleaning wheel rims by means of which sticky excess powdered pigments can be removed from the flange and the hub of the wheel rims prior to the baking process According to the invention, the device comprises a first brush which can be introduced into a hub of a wheel rim which is to be cleaned as well as a second brush which is disposed concentrically about the first brush and lies against a flange face of the wheel rim when the first brush is introduced into the hub of the wheel rim. The first brush can be axially displaced with respect to the second brush. Also provided is a drive which rotates the first and the second brush through a specific angle in each case.

A device of this kind can easily be integrated into an automated powder coating plant between the coating conveyor and the baking conveyor or retrofitted in existing powder coating plant. The mechanical abrasive operation for removing baked excess powdered pigments is rendered unnecessary by cleaning the wheel rims of excess powdered pigments prior to the baking process. A significant improvement in quality with regard to dimensional and positional tolerances of the wheel rims is achieved as a result. Labour costs are in addition reduced.

The first brush is preferably mounted so as to be springy towards the second brush. It is thus automatically introduced through spring force into the hub of the wheel rim without a separate positioning mechanism for introducing the first brush being required.

A third brush is advantageously provided, this being disposed inside the second brush orthogonally to the first brush and also lying against the flange face of the wheel rim when the first brush is introduced into the hub of the wheel rim. The third brush is driven together with the first brush by the drive and can be axially displaced with the first brush with respect to the second brush. The third brush improves the cleaning of the wheel rims.

The first and the second brush are preferably driven by the drive such that they execute rotational movements in opposite directions of rotation. This prevents a torque from being exerted on the wheel rim. Therefore the wheel rim does not need to be specially secured during cleaning.

In one advantageous development a gripper is provided which is formed such that it grips the wheel rim which is to be cleaned in its hub and deposits it on the second brush, which is disposed horizontally with its brush side upwards. The first brush is then pushed downwards by the gripper and penetrates into the hub when the gripper is withdrawn. This permits a particularly simple arrangement which can easily be incorporated into the lacquering process which is provided. Moreover, the wheel rim is pressed against the brushes by its weight, which avoids complex adjustment and monitoring of the brush pressure.

A suction device for sucking off the excess powdered lacquer which has been brushed off during the brushing operation is expediently provided.

The bristles of the first brush may be disposed in two opposite circle segments on an axial brush body and the bristles of the third brush in two circle segments which have been left free by the first brush. Particularly thorough cleaning is guaranteed and the removal by suction of excess powdered lacquer is improved as a result.

The angle through which the brushes are rotated for cleaning is advantageously approximately 180° in both directions, i.e. the brushes are rotated to-and-fro through this angle once in each case. This results in an adequate cleaning result with a short cleaning period.

In order to increase the throughput of wheel rims, a plurality of devices can be grouped into one arrangement, in which the drives of the devices are expediently coupled together.

In the method according to the invention
- a wheel rim which is to be cleaned is gripped by a gripper and deposited with a flange face downwards on a cleaning device,
- in the process the gripper presses a spring-mounted first brush downwards and the wheel rim comes to lie with its flange face on a second brush disposed concentrically about the first brush,
- the gripper is then released and withdrawn upwards and in the process the first brush is introduced through spring force into the hub of the wheel rim, and
- the first and the second brush are rotated through a specific angle in each case.

These and other objects and advantages will be made apparent from the following brief description of the drawings and the detailed description of the invention.

DETAILED DESCRIPTION OF THE PRESENT INVENTION

Figure 1:
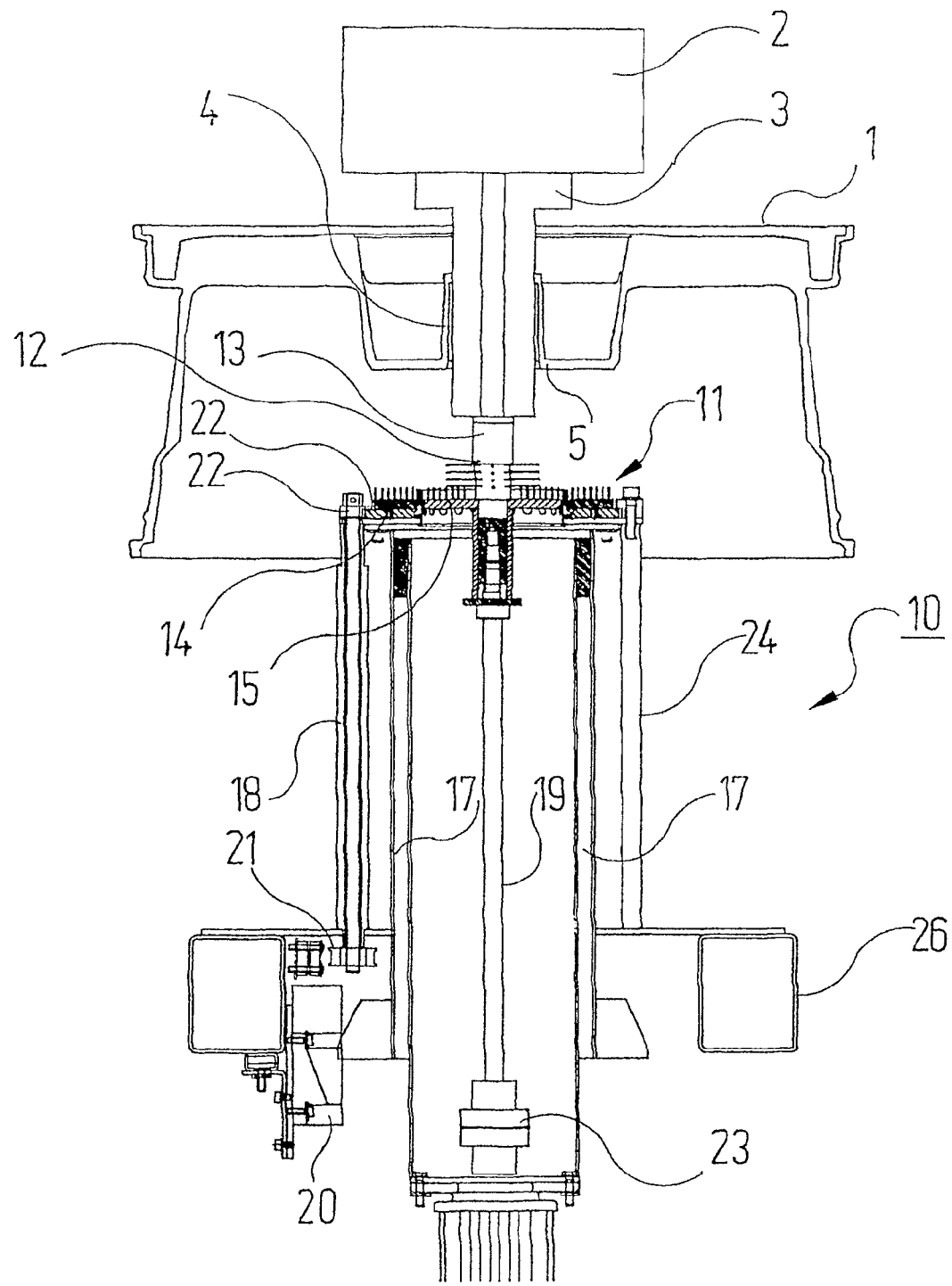
FIG. 1 is a section through the cleaning device prior to positioning a wheel rim.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

The cleaning device 10 which is shown in FIG. 1 comprises a depositing ring 11 with three rotating brushes 12, 14 and 15. A wheel rim 1 can be deposited with its flange side 5 downwards on the depositing ring 11 by a handling appliance 2 with a gripper 3. In the centre of the locating ring 11 is the hub brush 12, the brush body 13 of which projects upwards beyond the portion which is set with bristles. An outer flange brush 14 is rotatably mounted on the depositing ring 11. The bristles of the flange brush 14 are oriented vertically upwards, the bristles of the hub brush 12 substantially horizontally outwards. A second, inner flange brush 15, which is connected to the hub brush 12 in a rotationally rigid manner, is located between the outer flange brush 14 and the hub brush 12.

The support ring 11 is borne by four rods 24 which are mounted on a frame 26. The hub brush 12 and the second flange brush 15 are fastened to a central drive shaft 19 which is mounted so as to be springy downwards with respect to the support ring 11 at two spring-mounted suspension mounts 17 and is driven by a drive unit 23. The flange brush 14 is driven by means of a lateral drive shaft 18, at the lower end of which a drive wheel 21 is seated, this being coupled to a drive unit 20, and at the upper end of which a pinion 22 is located, this meshing with an annular gear wheel 22' to which the flange brush 14 is fastened.

Figure 2:
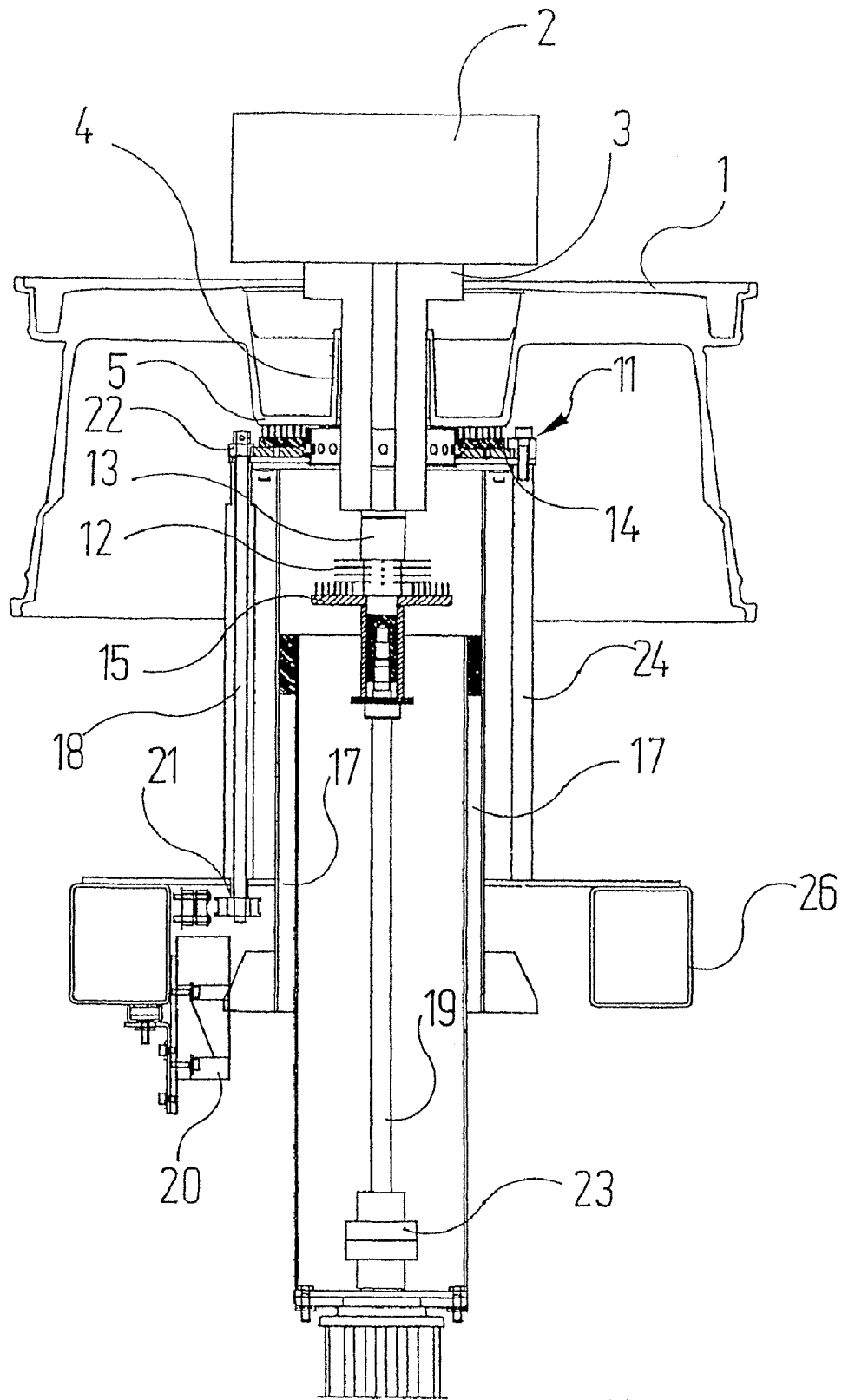
FIG. 2 is a section through the cleaning device after positioning a wheel rim.
Figure 3:
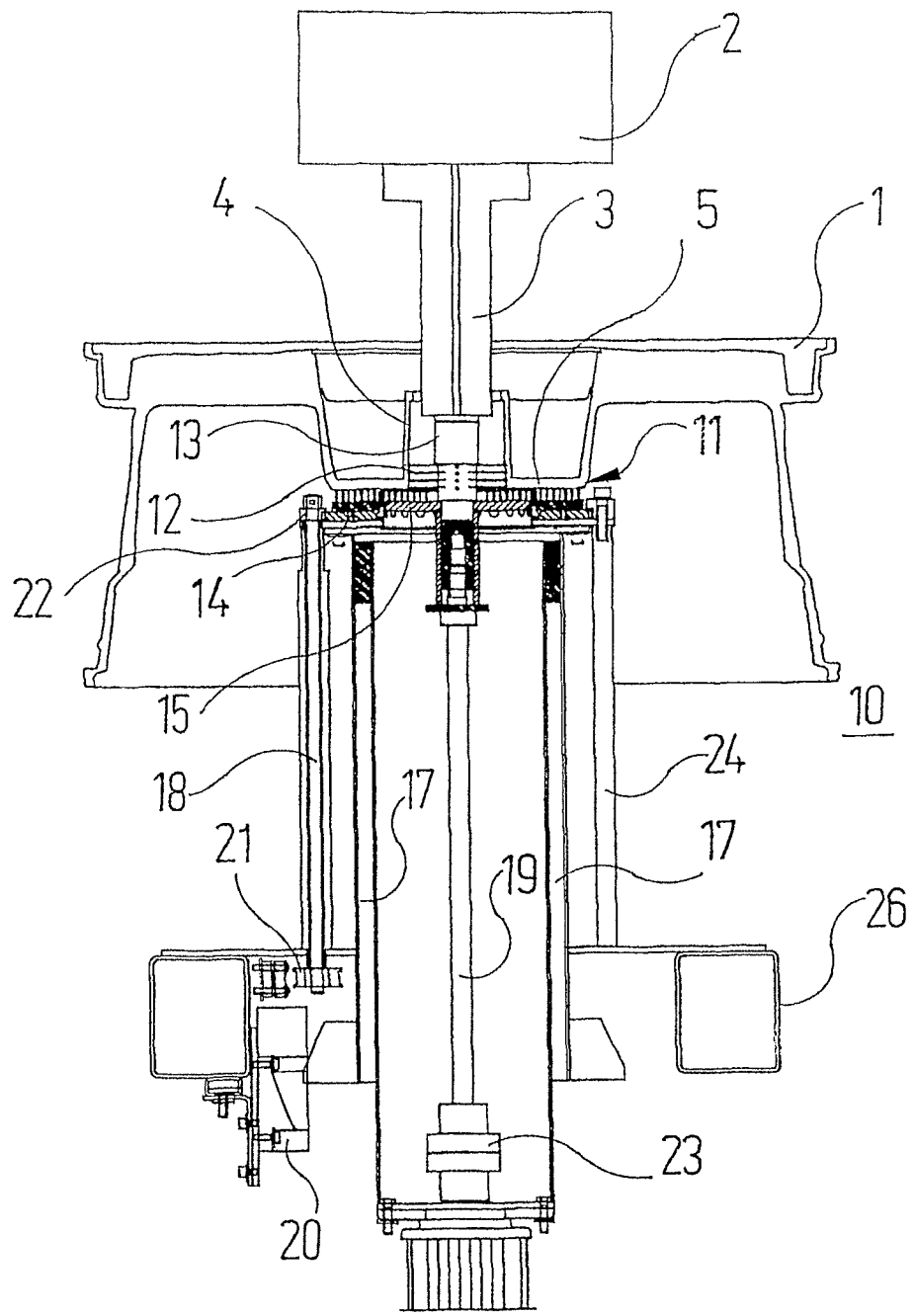
FIG. 3 is a section through the cleaning device with positioned wheel rim after withdrawing the gripper and FIG. 4 is a plan view onto the cleaning device without a wheel rim.

The gripper 3 grips the wheel rim 1 through the hub 4 and holds the wheel rim 1 in the spread-out state with the flange 5 downwards. FIG. 1 shows the state shortly before the gripper 3 deposits the wheel rim 1 on the support ring 11 of the cleaning device 10. The gripper 3 then pushes against the upward extended brush body 13 of the hub brush 12 with its end face. The state after the gripper 3 has deposited the wheel rim 1 on the support ring 11 is shown in FIG. 2. As the hub brush 12 and the inner flange brush 15 connected to the latter are mounted so as to be springy downwards, they move downwards out of the way of the gripper 3. The gripper 3 is now released and withdrawn upwards. The hub brushes 12 and the inner flange brush 15 are then returned upwards to their rest position through the force of the spring-mounted suspension mounts 17. This results in the hub brush penetrating into the hub 4 of the wheel rim 1 and the inner flange brush 15 being applied to the flange 5 of the wheel rim 1. This state is shown in FIG. 3.

This is followed by the brushing operation, i.e. the actual cleaning of the wheel rim 1. For this purpose the flange brush 14 is rotated to-and-fro through a half-revolution by the drive unit 20. The hub brush 12 and the inner flange brush 15 are at the same time rotated to-and-fro through a half-revolution in the opposite direction of rotation by the drive unit 23. The rotational movements are executed in opposite directions in order to prevent a torque from being exerted on the wheel rim 1. The brush geometries and relative measurements of the three brushes are dimensioned accordingly for this purpose.

Figure 4:
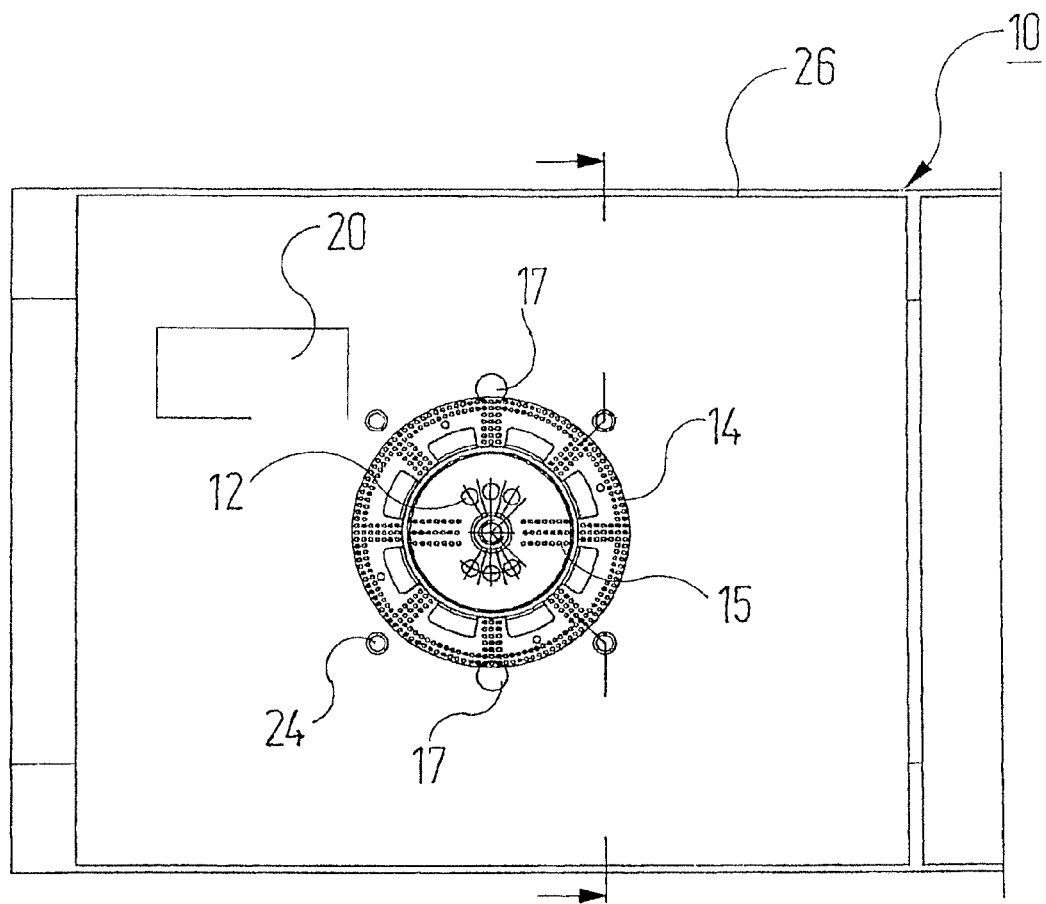

FIG. 4 shows the device 10 without a wheel rim in a plan view from above. The arrangement of the bristles can be seen here. The outer flange brush 14 has an outer bristle collar and eight webs of bristles disposed radially inwards. The hub brush 12 has bristles which are disposed in two circle segments lying diametrically opposite one another. In the case of the inner flange brush 15, however, the bristles are only disposed in two webs which reach into the circle segments which have been left free by the hub brush. The drive unit 20, the spring-mounted suspension mount 17 and the rods 24 which bear the support ring 11 (not shown) are only indicated schematically in FIG. 4.

The working space is evacuated by means of an external suction device (not shown) during the brushing operation. After being cleaned, the wheel rim 1 can be gripped again by the gripper 3, lifted off the cleaning device 10 and conveyed to the further baking operation.

A plurality of cleaning devices of the illustrated type can be operated side by side in an industrial powder coating plant. In this case their drive units can be coupled by means of a rotating drive belt, for example, so that just one motor is required to drive all the brushes.

It is again emphasized that the above-described embodiments of the present invention, particularly, any "preferred" embodiments, are possible examples of implementations merely set forth for a clear understanding of the principles of the invention. Many variations and modifications may be made to the above-described embodiments of the invention without substantially departing from the spirit and principles of the invention. All such modifications are intended to be included herein within the spirit of the invention and the scope of protection is only limited by the accompanying claims.

The invention claimed is:

1. A device for cleaning wheel rims, comprising:
a first brush which can be introduced into a hub of a wheel rim which is to be cleaned,
a second brush which is disposed concentrically about the first brush and lies against a flange face of the wheel rim when the first brush is introduced into the hub of the wheel rim, and,
a drive for rotating the first and the second brush through a specific angle in each case, and wherein the first brush can be axially displaced with respect to the second brush and wherein the first brush and the second brush are rotated to-and-fro by a determined angle; and,
wherein a third brush which is disposed inside the second brush orthogonally to the first brush and also lies against the flange face of the wheel rim when the first brush is introduced into the hub of the wheel rim, wherein the third brush is driven together with the first brush by the drive and can be axially displaced with the first brush with respect to the second brush.

2. The device of claim 1, wherein the first brush is mounted so as to be springy towards the second brush.

3. The device of claim 2, wherein a third brush which is disposed inside the second brush orthogonally to the first brush and also lies against the flange face of the wheel rim when the first brush is introduced into the hub of the wheel rim, wherein the third brush is driven together with the first brush by the drive and can be axially displaced with the first brush with respect to the second brush.

4. The device of claim 1, wherein the first and the second brush are driven by the drive such that they execute rotational movements in opposite directions of rotation.

5. The device of claim 4, wherein the first brush comprises bristles which are disposed in two opposite circle segments on an axial brush body, and that the third brush comprises bristles which are disposed inside the two opposite circle segments which have been left free by the first brush.

6. The device of claim 1, further comprising a gripper which is formed such that it grips the wheel rim which is to be cleaned in its hub and deposits it on the second brush, which is disposed horizontally with its brush side upwards, wherein the first brush is pushed downwards by the gripper and penetrates into the hub when the gripper is withdrawn.

7. The device of claim 6, wherein the first brush comprises bristles which are disposed in two opposite circle segments on an axial brush body, and that the third brush comprises bristles which are disposed inside the two opposite circle segments which have been left free by the first brush.

8. The device of claim 1, further comprising a suction device for powdered pigment which is brushed off.

9. The device of claim 8, wherein the first brush comprises bristles which are disposed in two opposite circle segments on an axial brush body, and that the third brush comprises bristles which are disposed inside the two opposite circle segments which have been left free by the first brush.

10. The device of claim 1, wherein the first brush comprises bristles which are disposed in two opposite circle segments on an axial brush body, and that the third brush comprises bristles which are disposed inside the two opposite circle segments which have been left free by the first brush.

11. The device of claim 1, wherein the angle through which the brushes are rotated is approximately 180° in both directions.

12. An arrangement of a plurality of devices for cleaning wheel rims, comprising:
a plurality of the devices of claim 1, wherein the drive of each of the plurality of devices are coupled together.

13. A device for cleaning wheel rims, comprising:
a first brush which can be introduced into a hub of a wheel rim which is to be cleaned,
a second brush which is disposed concentrically about the first brush and lies against a flange face of the wheel rim when the first brush is introduced into the hub of the wheel rim, and, a drive for rotating the first and the second brush through a specific angle in each case, and wherein the first brush can be axially displaced with respect to the second brush and wherein the first brush and the second brush are rotated to-and-fro by a determined angle, and,
wherein the first and the second brush are driven by the drive such that they execute rotational movements in opposite directions of rotation.

14. A device for cleaning wheel rims, comprising:
a first brush which can be introduced into a hub of a wheel rim which is to be cleaned;
a second brush which is disposed concentrically about the first brush and lies against a flange face of the wheel rim when the first brush is introduced into the hub of the wheel rim a drive for rotating the first and the second brush through a specific angle in each case; and,
a gripper which is formed such that it grips the wheel rim which is to be cleaned in its hub and deposits it on the second brush, which is disposed horizontally with its brush side upwards, wherein the first brush is pushed downwards by the gripper and penetrates into the hub when the gripper is withdrawn; and,
wherein the first brush can be axially displaced with respect to the second brush and wherein the first brush and the second brush are rotated to-and-fro by a determined angle.

* * * * *